United States Patent
Collins et al.

(10) Patent No.: US 10,627,486 B2
(45) Date of Patent: Apr. 21, 2020

(54) SENSOR CLEANER

(71) Applicant: Ford Global Technologies, LLC, Dearborn, MI (US)

(72) Inventors: Patrick Gordon Collins, Canton, MI (US); David Doellstedt, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 165 days.

(21) Appl. No.: 15/889,622

(22) Filed: Feb. 6, 2018

(65) Prior Publication Data
US 2019/0242980 A1    Aug. 8, 2019

(51) Int. Cl.
| G01S 7/481 | (2006.01) |
| G01S 17/93 | (2020.01) |
| G01S 17/931 | (2020.01) |
| G02B 27/00 | (2006.01) |

(52) U.S. Cl.
CPC .......... *G01S 7/4813* (2013.01); *G01S 17/931* (2020.01); *G02B 27/0006* (2013.01)

(58) Field of Classification Search
CPC .. G01S 7/4813; G01S 17/931; G02B 27/0006
USPC ....................................................... 250/239
See application file for complete search history.

(56) References Cited

U.S. PATENT DOCUMENTS

| 4,152,753 | A | 5/1979 | Amann | |
| 6,223,003 | B1* | 4/2001 | Kawano | G03B 1/04 396/410 |
| 6,665,493 | B2* | 12/2003 | Miyazaki | G03B 1/00 396/406 |
| 9,969,363 | B1 | 5/2018 | Wachter | |

FOREIGN PATENT DOCUMENTS

| CN | 102131045 B | 7/2012 |
| CN | 203196916 U | 9/2013 |
| DE | 20221683 U1 | 12/2006 |
| DE | 102012015950 B3 | 1/2014 |
| DE | 102015013171 A1 | 4/2017 |
| EP | 1308747 B1 | 3/2007 |
| GB | 2198256 A | 6/1988 |
| GB | 2535862 A | 8/2016 |
| WO | 2013162372 A1 | 10/2013 |
| WO | 2017076877 A1 | 5/2017 |

OTHER PUBLICATIONS

Search and Examination Report from United Kingdom Intellectual Property Office (UKIPO) dated Oct. 7, 2019 regarding Application GB1901566.8 (5 pages).
Combined Search and Examination Report from UKIPO dated Jul. 29, 2019 regarding Application No. GB1901566.8 (10 pages).

* cited by examiner

*Primary Examiner* — Seung C Sohn
(74) *Attorney, Agent, or Firm* — Frank A. MacKenzie; Bejin Bieneman PLC

(57) ABSTRACT

An assembly includes a first housing and a sensor in the first housing. The assembly includes a second housing. The assembly includes a first spool and a second spool rotatably supported in the second housing and spaced from each other. The assembly includes a transparent film extending from the first spool around the first housing and received by the second spool.

19 Claims, 6 Drawing Sheets

SENSOR CLEANER

BACKGROUND

A vehicle may receive information from an optical sensor. The information from the optical sensor may be used to navigate the vehicle, e.g., to avoid vehicle collisions, maintain a lane of travel, etc. However, the optical sensor may be rendered wholly or partially inoperable, e.g., when a contaminant such as dirt, precipitation, etc., blocks a field of view of the sensor.

DETAILED DESCRIPTION

Figure 1:
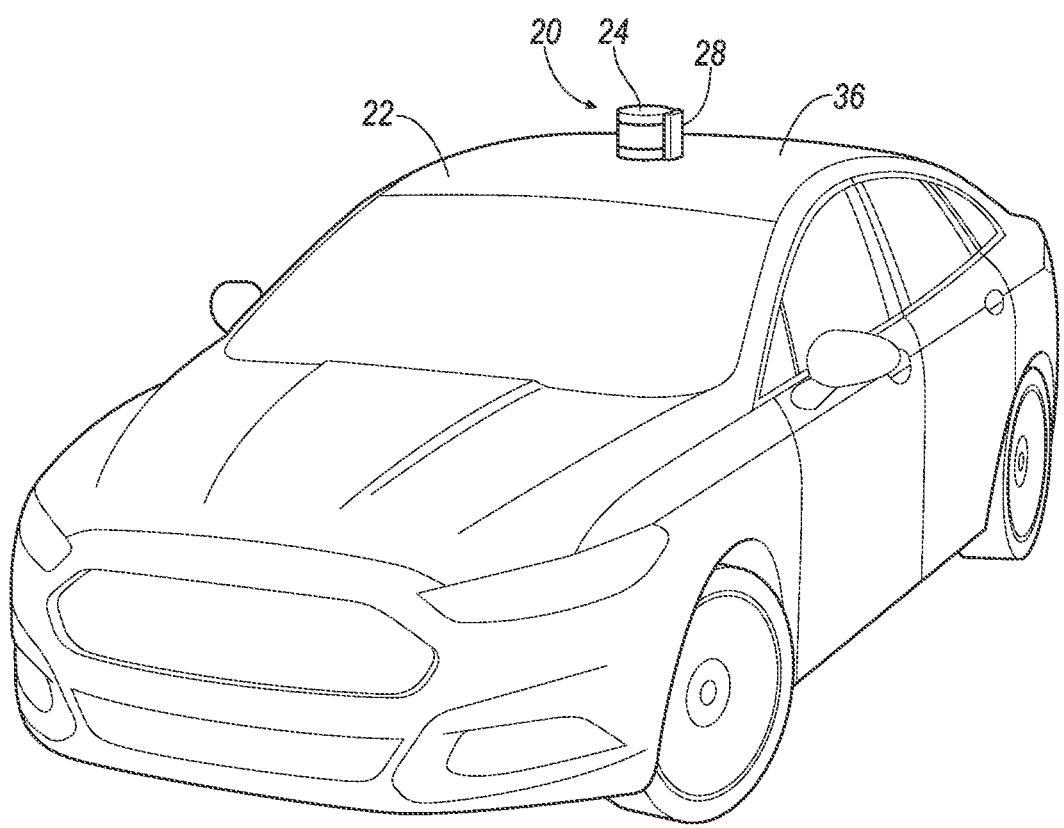
FIG. 1 is a perspective view of a vehicle having a sensor assembly.

An assembly includes a first housing. The assembly includes a sensor in the first housing. The assembly includes a second housing. The assembly includes a first spool and a second spool rotatably supported in the second housing and spaced from each other. The assembly includes a transparent film extending from the first spool around the first housing and received by the second spool.

The first spool may be adjacent the second spool.

The transparent film may abut the first housing.

The first housing may include a lens defining a circumference, the transparent film may extend around the circumference.

The first housing may include a base, and the lens may rotate relative the base.

The first spool may define a first axis, and the second spool may define a second axis, the second axis parallel to and spaced from the first axis.

The transparent film may extend from the first spool between the first spool and the first housing, and the transparent film may be received by the second spool between the second spool and the first housing.

The sensor may be a LIDAR sensor.

The assembly may include a nozzle supported by the second housing and designed to spray fluid on the transparent film.

The second housing may include a drain.

An assembly includes a sensor. The assembly includes a housing having a first slot and a second slot. The assembly includes a first spool in the housing. The assembly includes a second spool in the housing and adjacent the first spool in a radial direction. The assembly includes a transparent film extending from the first spool, through the first slot, around the sensor, through the second slot, and received by the second spool.

The first spool and the second spool may be between the sensor and the first slot and the second slot.

The first slot and the second slot may be between the sensor and the first spool and the second spool.

The sensor may be in the housing.

The assembly may include a wiper designed to wipe the transparent film.

The wiper may be supported by the housing at the second slot.

The transparent film may extend from the first spool and may be received by the second spool between the first spool and the second spool.

The housing may include a lens and the transparent film may abut the lens.

The housing may include a base and a cap, the transparent film may be disposed between the base and the cap.

With reference to the Figures, wherein like numerals indicate like parts throughout the several views, an assembly 20 for a vehicle 22 includes a first housing 24 and a sensor 26 in the first housing 24. The assembly 20 includes a second housing 28, and a first spool 30 and a second spool 32 rotatably supported in the second housing 28 and spaced from each other. The assembly 20 includes a transparent film 34 extending from the first spool 30 around the first housing 24 and received by the second spool 32.

The assembly 20 provides a clear field of view to the sensor 26, e.g., by moving the transparent film 34 relative to the first housing 24 to remove a portion of transparent film 34 that is contaminated with dirt, precipitation, etc., to replace the contaminated portion with an uncontaminated portion of the transparent film 34. The assembly 20 permits the transparent film 34 to be easily replaced, e.g., the second housing 28 may be separated from the first housing 24 and replaced with a new second housing 28 having a new transparent film 34 therein.

Figure 7:
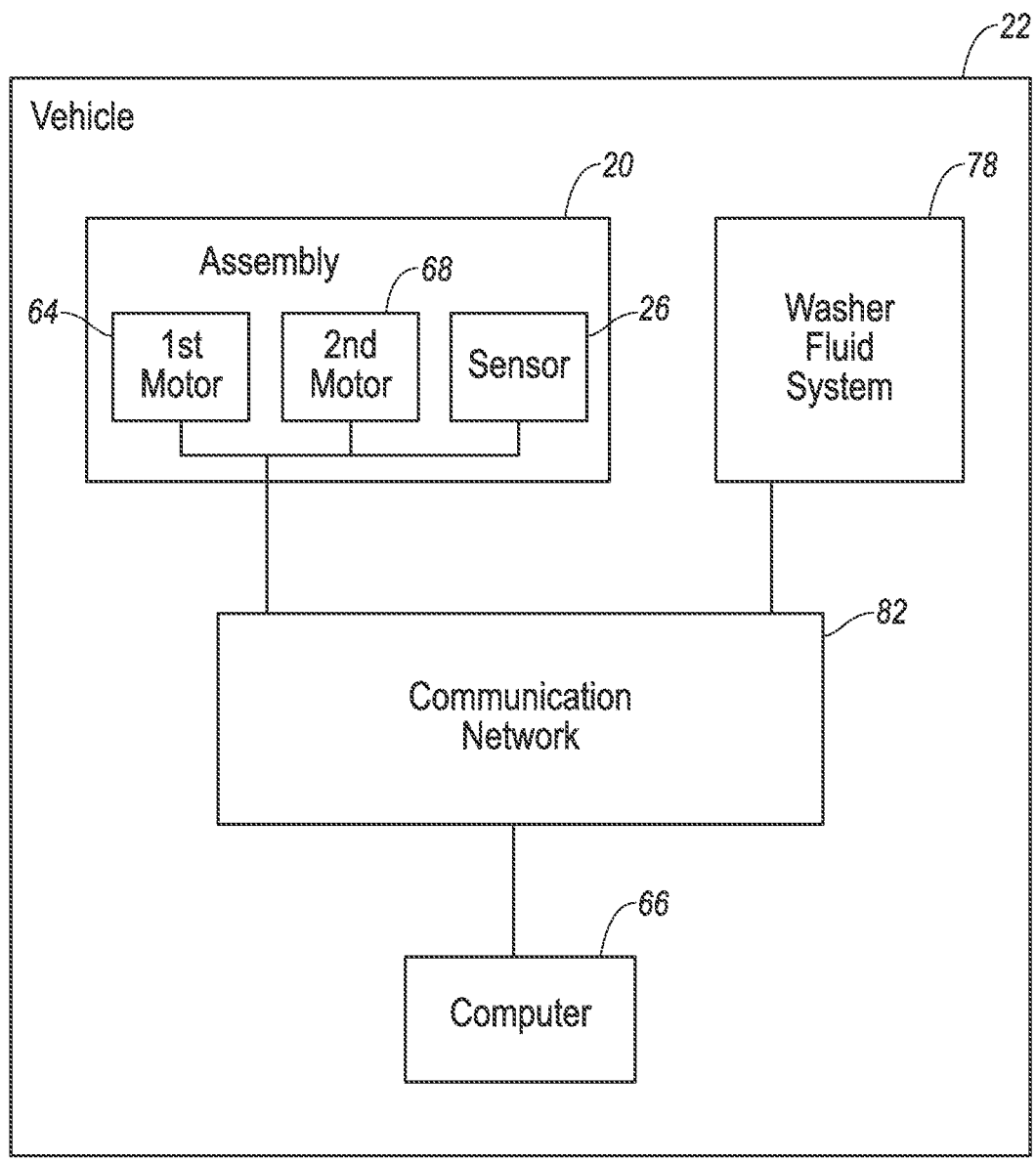
FIG. 7 is a block diagram of components of the vehicle.

The vehicle 22, shown in FIGS. 1 and 7, may be any passenger or commercial automobile such as a car, a truck, a sport utility vehicle, a crossover vehicle, a van, a minivan, a taxi, a bus, etc.

The vehicle 22 may include a roof 36 that provides cover for occupants for the vehicle 22. The roof 36 may include an internal panel, an exterior panel, and a headliner. The internal panel provides support to the exterior panel, the headliner, etc. The internal panel may be made of steel, aluminum, carbon fiber, or any other suitable material. The headliner and the exterior panel provide class-A surfaces to the roof 36, i.e., surfaces specifically manufactured to have a high-quality, finished aesthetic appearance free of blemishes, etc. The roof 36 may support the assembly 20.

The first housing 24 may include a base 38, a lens 40, and a cap 42. The base 38 may support the lens 40, the sensor 26, etc. The first housing 24 may define a chamber 50, shown in FIGS. 2-6. For example, the base 38, the cap 42, and the lens 40 may define the chamber 50 between the base 38 and the cap 42. As set forth further below, the sensor 26 may be disposed in the chamber 50.

Figure 3:
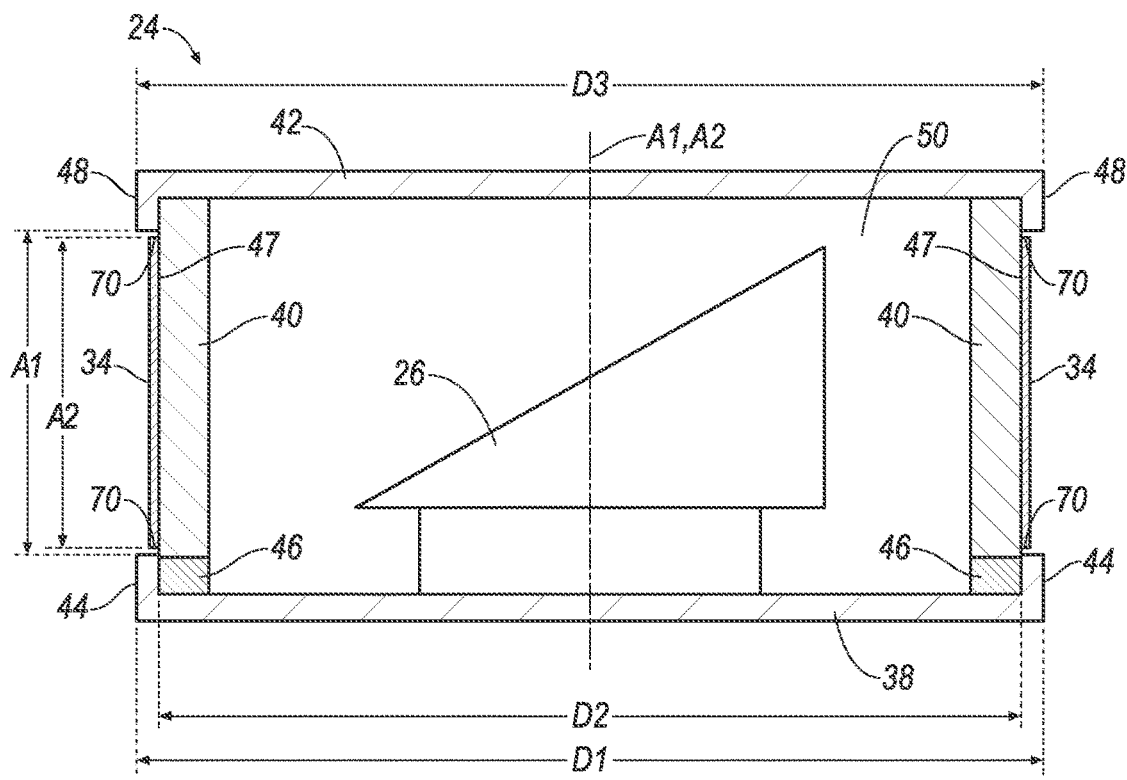
FIG. 3 is a side cross section of the sensor assembly.

The base 38 may be plastic or any other suitable material. The base 38 may define a circumference having a diameter D1. The diameter D1 may be at an outer surface 44 of the base 38, as shown in FIG. 3. The base 38 may define an axis A1.

The lens 40 is transparent or semitransparent such that the sensor 26 may detect objects through the lens 40. The lens 40 may be positioned to cover a field of view of the sensor 26. To put it another way, the sensor 26 may be positioned such that light detected by the sensor 26 passes through the lens 40. The lens 40 may be any suitable material, e.g., glass, plastic, etc.

The lens 40 may define a circumference C, shown in FIGS. 2-6. The circumference C extends around the lens 40. The circumference C has a diameter D2, shown in FIGS. 2, 3 and 5. The diameter D2 may be at an outer surface 47 of the lens 40. The diameter D2 of the lens 40 may be less than the diameter D1 of the base 38. The lens 40 may define an axis A2. The lens 40 may define a height H1, e.g., between the base 38 and the cap 42, as shown in FIG. 3.

The lens 40 may rotate relative the base 38. For example, the assembly 20 may include a bushing 46, a thrust bearing, etc., positioned between the base 38 and the lens 40, as shown in FIG. 3. The axis A2 of the lens 40 may be centered on the axis A1 of the base 38. The lens 40 may rotate about the axes A1, A2 relative to the base 38.

The cap 42 of the first housing 24 may positioned opposite the base 38 relative to the lens 40. To put it another way, the lens 40 may be between the base 38 and the cap 42. The cap 42 may define a circumference having a diameter D3, as shown in FIG. 3. The diameter D3 may be at an outer surface 48 of the cap 42. The diameter D3 of the cap 42 may be greater than the diameter D2 of the lens 40.

The sensor 26 may detect the external world. For example, the sensor 26 may be a scanning laser range finder, a light detection and ranging (LIDAR) device, an image processing sensor such as a camera, etc. The sensor 26 may define a field of view, e.g., light from within the field of view may be detected by the sensor 26. The field of view may extend a majority of the angular distance around the circumference C of the lens 40, e.g., greater than 180 degrees. For example, the field of view may extend 315 degrees around the circumference C of the lens 40.

The sensor 26 is in the first housing 24. For example, sensor 26 may be supported by the base 38 in the chamber 50. The sensor 26 may be fixed to the base 38, e.g., with a fastener, clip, etc. The sensor 26 may be positioned such that the lens 40 covers the field of view of the sensor 26. In other words, as set forth above, the sensor 26 may be positioned such that light detected by the sensor 26 passes through the lens 40.

The second housing 28 may define a chamber 56, shown in FIGS. 2 and 4-6. For example, the second housing 28 may enclose the chamber 56. The second housing 28 may include a first slot 58 and a second slot 60, shown in FIGS. 4 and 6. The first slot 58 and the second slot 60 may be elongated parallel to each other. The first slot 58 and the second slot 60 may extend from the chamber 56 to outside the second housing 28. As set forth further below, the first spool 30 and the second spool 32 may be disposed in the chamber 56, and the transparent film 34 may extend through the first slot 58 and the second slot 60. The second housing 28 may be plastic or another other suitable material.

The second housing 28 may be supported by the first housing 24. The second housing 28 may be releasably fixed in position relative to the first housing 24, e.g., with a track, a clip, a fastener, etc. For example, the second housing 28 may be releasably fixed to inhibit movement of the second housing 28 relative to the first housing 24. The second housing 28 may be released from such fixing such that the second housing 28 may be removed from being supported by the first housing 24, e.g., to replace the second housing 28 with another second housing 28.

Figure 2:
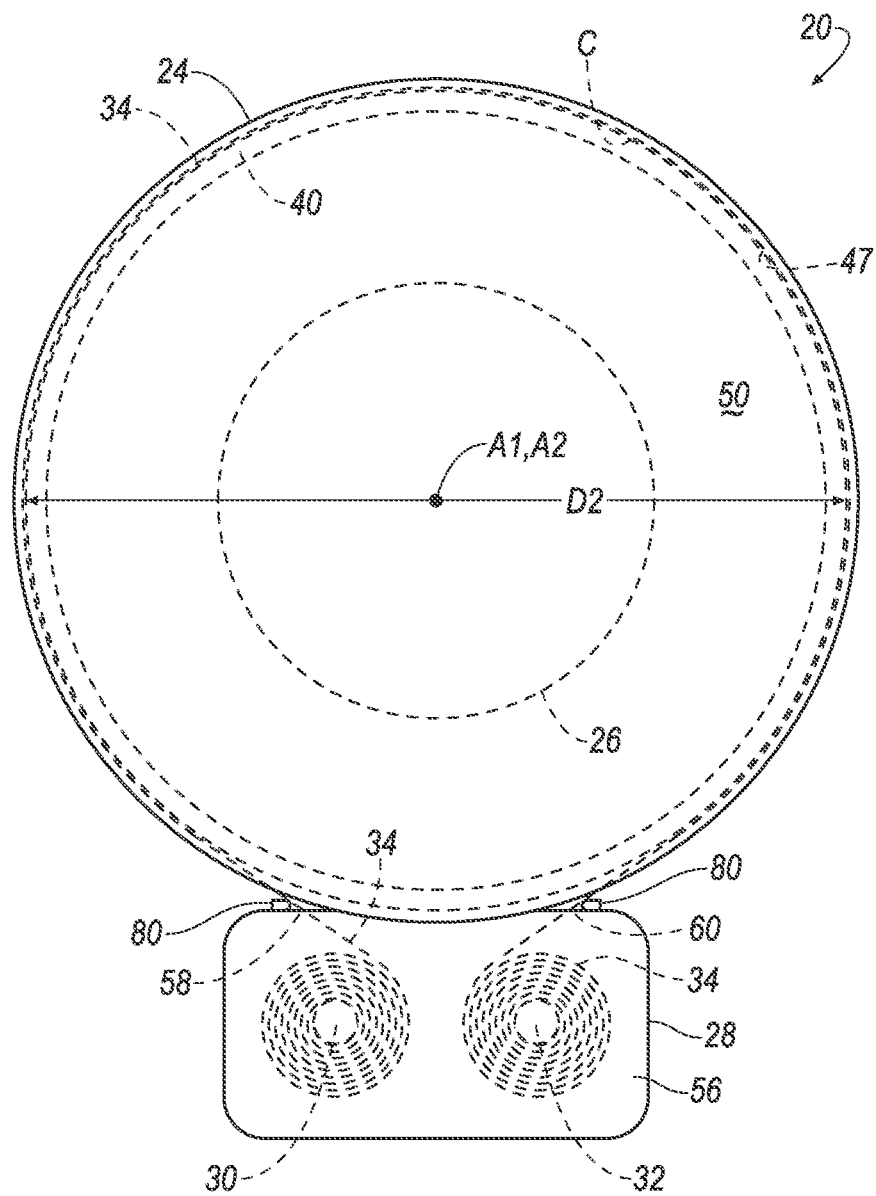
FIG. 2 is a top view of the sensor assembly.
Figure 4:
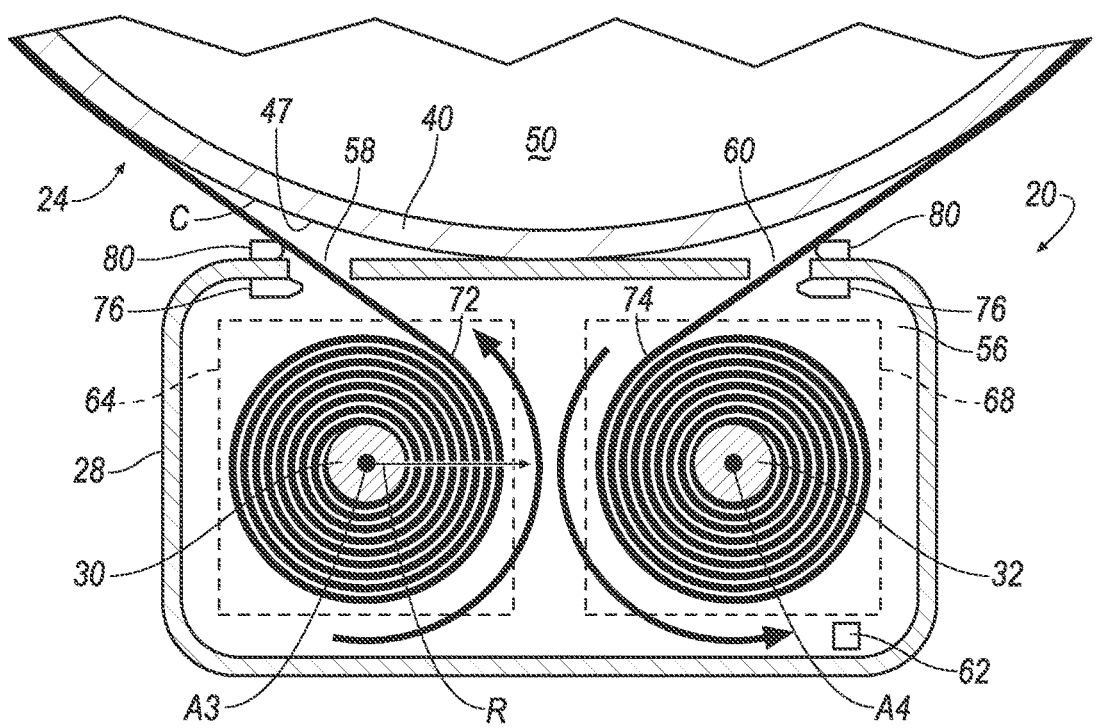
FIG. 4 is a top cross section of the sensor assembly.

In one example, as shown in FIGS. 1, 2, and 4, the second housing 28 may be supported outside the chamber 50 of the first housing 24. In another example, as shown in FIGS. 5 and 6, the second housing 28 may be supported in the chamber 50 of the first housing 24.

Figure 5:
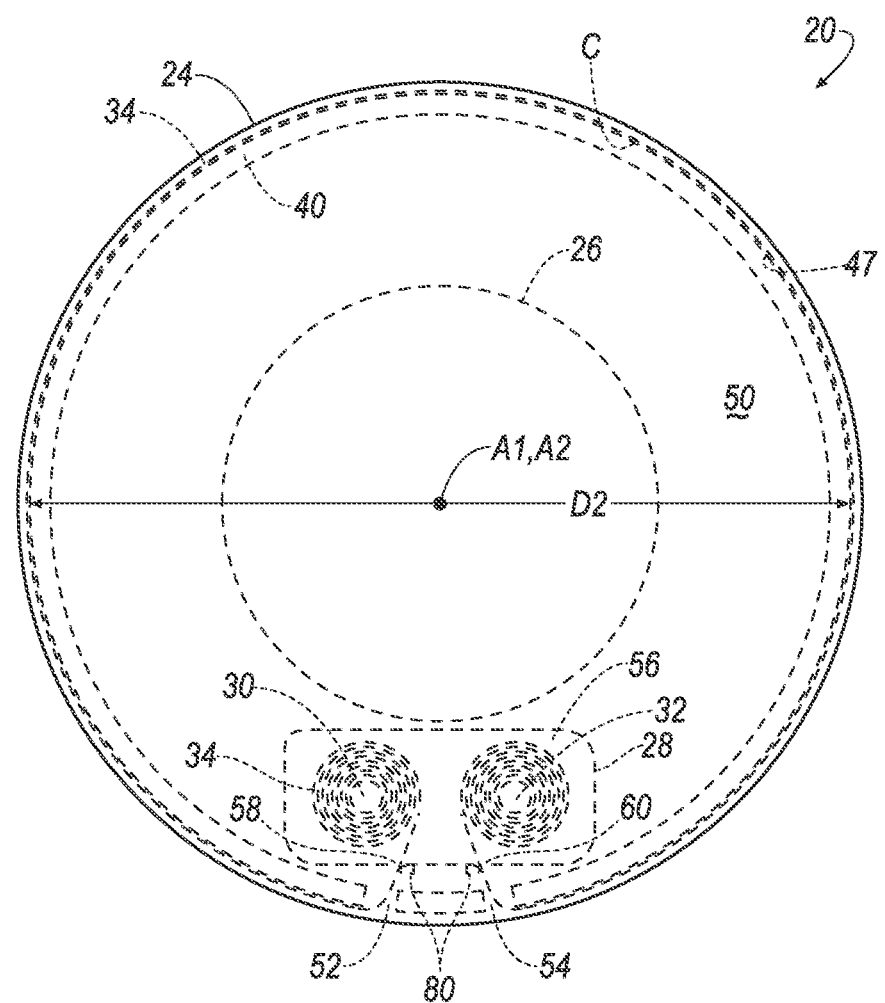
FIG. 5 is a top view of another embodiment of the sensor assembly.
Figure 6:
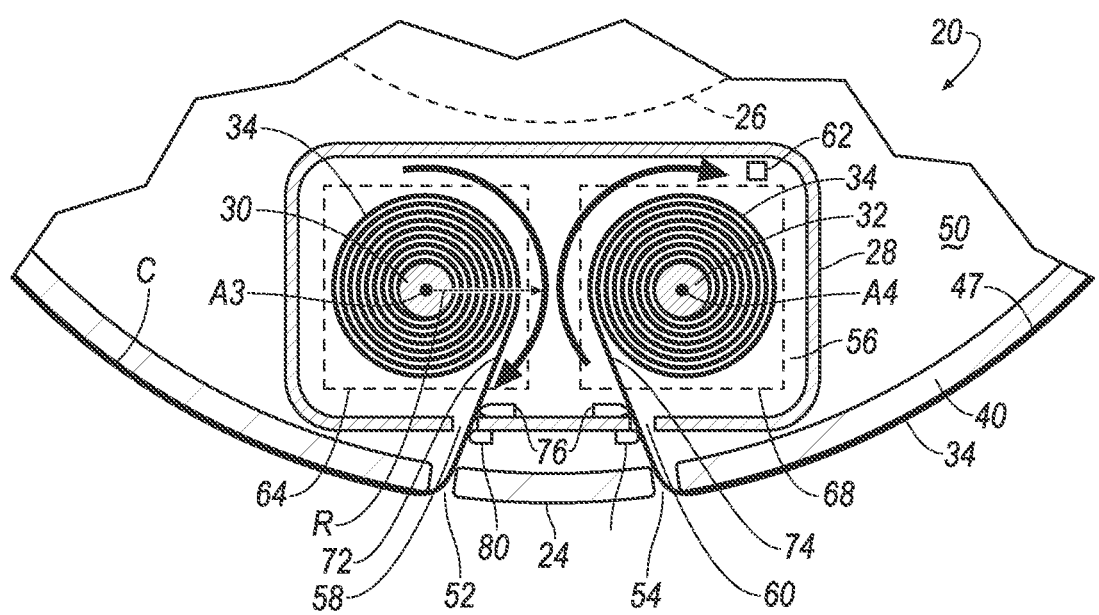
FIG. 6 is a top cross section of the sensor assembly of FIG. 5.

With continued reference to FIGS. 5 and 6, in the example where the second housing 28 is supported in the chamber 50 of the first housing 24, the first housing 24 may have a first slot 52 and a second slot 54. The transparent film 34 may extend from the first spool 30, through the first slot 58 of the second housing 28, through the first slot 52 of the first housing 24, around the first housing 24 to the second slot 54 of the first housing 24, and through the second slot 54 of the first housing 24 and the second slot 60 of the second housing 28 to the second spool 32.

The first slot 52 and the second slot 54 extend from the chamber 50 to outside the first housing 24. The first slot 52 and the second slot 54 may be elongated along the axis A2 of the lens 40, e.g., parallel to the axis A2 and spaced from the axis A2 in a radial direction. The first slot 52 and the second slot 54 may be adjacent to each other.

The second housing 28 may include a drain 62. The drain 62 is positioned such that gravity may urge liquid to flow from the chamber 56 out of the drain 62.

The first spool 30 defines a first axis A3, and the second spool 32 defines a second axis A4. The first spool 30 and the second spool 32 may be elongated along their respective axis A3, A4. The first spool 30 and the second spool 32 may be rotatably supported in the first housing 24, as shown in FIGS. 5 and 6. The first spool 30 and the second spool 32 may be rotatably supported in the second housing 28, as shown in FIGS. 2 and 4-6. For example, the first spool 30 and the second spool 32 may each be supported via a bushing, a bearing, etc. The first spool 30 and the second spool 32 may each rotate about their respective axis A3, A4. The first spool 30 and the second spool 32 may be parallel. For example, the first axis A3 of the first spool 30 may be parallel to the second axis A4 of the second spool 32.

The first spool 30 and the second spool 32 may be spaced from each other. For example, the first axis A3 of the first spool 30 may be spaced from the second axis A4 of the second spool 32. The first spool 30 may be spaced from the first spool 30 in a radial direction R, shown in FIGS. 4 and 6. The radial direction R may extend perpendicularly from the axes A3, A4 of the first spool 30 and/or the second spool 32.

The first spool 30 may be adjacent the second spool 32. In other words, no other components are between the first spool 30 and the second spool. The first spool 30 may be close enough to the second spool 32 such that the sensor 26 may not fit therebetween. The first spool 30 and the second spool 32 may be rotatable about axes, respectively, that are parallel to each other. The first spool 30 and the second spool 32 may be vertically aligned with each other along the respective axis.

The first spool 30 and the second spool 32 may be between the sensor 26 and the first slot 52, 58 and the second slot 54, 60, as shown in FIG. 5. As another example, the first slot 58 and the second slot 60 may be between the sensor 26 and the first spool 30 and the second spool 32, as shown in FIG. 2.

The assembly 20 may include at least one motor 64, 68. As described further below, the motor 64, 68 rotatably drives at least one of the first spool 30 and the second spool 32 to move the transparent film 34. As an example, the assembly 20 may include a first motor 64 and/or a second motor 68. The adjectives "first" and "second" are used to identify the motors and are not intended to indicate order or importance.

The first motor 64 may be rotatably coupled to the first spool 30, e.g., via a belt, a shaft, a gear reduction unit, etc. Actuation of the first motor 64, e.g., in response to receiving an instruction from a computer 66, causes the first spool 30 to rotate. The first motor 64 may be supported by the second housing 28, the first housing 24, or any other suitable structure.

The assembly 20 may include a second motor 68. The second motor 68 may be rotatably coupled to the second spool 32, e.g., via belt shaft, gear reduction units, etc. Actuation of the second motor 68, e.g., in response to receiving an instruction from the computer 66, causes the second spool 32 to rotate. The second motor 68 may be supported by the second housing 28, the first housing 24, or any other suitable structure.

The transparent film 34 protects the lens 40. For example, the transparent film 34 may block dirt, precipitation, etc., from coming into contact with the lens 40. The transparent film 34 may be a thin transparent plastic, or any other suitable material. The transparent film 34 may be wound around the first spool 30. The transparent film 34 may be wound around the second spool 32. The transparent film 34 may define a height H2, e.g., between opposing side edges 70 of the transparent film 34, as shown in FIG. 3. The height H2 of the transparent film 34 may be less than the height H1 of the lens 40.

The transparent film 34 extends from the first spool 30. The transparent film 34 may extend from the first spool 30 at a location 72 where the transparent film 34 is tangential to the first spool 30 and the transparent film 34 wound around the first spool 30. The transparent film 34 may extend from the first spool 30 between the first spool 30 and the first housing 24, as shown in FIG. 4. For example, the location 72 where the transparent film 34 is tangential to the first spool 30 and the transparent film 34 wound around the first spool 30 may be between the first spool 30 and the first housing 24. The transparent film 34 may extend from the first spool 30 between the first spool 30 and the second spool 32. For example, the location 72 where the transparent film 34 is tangential to the first spool 30 and the transparent film 34 wound around the first spool 30 may be between the first spool 30 and the second spool 32. The transparent film 34 extending from the first spool 30 between the first spool 30 and the first housing 24, and/or between the first spool 30 and the second spool 32 increases an amount of the lens 40 that is protected by the transparent film 34.

The transparent film 34 may extend through the first slot 58 of the second housing 28. For example, the transparent film 34 may extend from in the chamber 56 of the second housing 28 to outside the second housing 28, as shown in FIGS. 2 and 4-6. The transparent film 34 may extend through the first slot 52 of the first housing 24. For example, the transparent film 34 may extend from in the chamber 50 of the first housing 24 to outside the first housing 24, as shown in FIGS. 5 and 6.

The transparent film 34 may extend around the first housing 24 and the sensor 26 therein. For example, the transparent film 34 may extend around the lens 40, e.g., around the circumference C of the lens 40. The transparent film 34 may abut the first housing 24. For example, the transparent film 34 may abut the lens 40. The transparent film 34 may be between the cap 42 and the base 38.

The transparent film 34 may extend through the second slot. For example, the transparent film 34 may extend from outside the first housing 24 to the chamber 50 of the first housing 24, as shown in FIGS. 5 and 6. The transparent film 34 may extend from outside the second housing 28 to the chamber 56 of the second housing 28, as shown in FIGS. 2 and 4-6.

The transparent film 3 is received by the second spool 32. The transparent film 34 may be received by the second spool 32 at a location 74 where the transparent film 34 is tangential to the second spool 32 and the transparent film 34 wound around the second spool 32. The transparent film 34 may be received by the second spool 32 between the second spool 32 and the first housing 24, as shown in FIG. 2. For example, the location 74 where the transparent film 34 is tangential to the second spool 32 and the transparent film 34 wound around the second spool 32 may be between the second spool 32 and the first housing 24. The transparent film 34 may be received by the second spool 32 between the first spool 30 and the second spool 32. For example, the location 74 where the transparent film 34 is tangential to the second spool 32 and the transparent film 34 wound around the second spool 32 may be between the first spool 30 and the second spool 32.

The assembly 20 may include a nozzle 76, shown in FIGS. 4 and 6. The nozzle 76 is designed to spray fluid on the transparent film 34. The nozzle 76 may be supported by the second housing 28 and positioned to direct fluid at the transparent film 34. The nozzle 76 may be supported in the chamber 56 of the second housing 28. The nozzle 76 may be fixed to the second housing 28, e.g., with a fastener, clip, etc. The nozzle 76 may be in fluid communication with a washer fluid system 78 of the vehicle 22 to provide washer fluid to the nozzle 76, or with any other suitable fluid delivery structure.

The assembly 20 may include one or more wipers 80. The wipers 80 are designed to wipe the transparent film 34. For example, the wipers 80 may abut the transparent film 34. The wipers 80 may be rubber, flexible plastic, or any other suitable material. The wipers 80 may be supported by the second housing 28. For example, one of the wipers 80 may be supported by the second housing 28 at the first slot 58 and one of the wipers 80 may be supported by the second housing 28 at the second slot 60, as shown in FIGS. 2 and 4-6. The wipers 80 may be supported by the first housing 24. For example, one of the wipers 80 may be supported by the first housing 24 at the first slot 52 and one of the wipers 80 may be supported by the first housing 24 at the second slot 54 (not shown).

The washer fluid system 78, shown in FIG. 7, includes components known for delivering fluid to various surfaces of the vehicle 22, e.g., to a surface of a windshield. The washer fluid system 78 may include a fluid reservoir and a fluid pump. The fluid reservoir and the pump may be in fluid communication with the nozzle 76 such that the washer fluid system 78 may actuate the pump to move fluid from the fluid reservoir to the nozzle 76, e.g., in response to receiving an instruction from the computer 66.

The vehicle 22 may include a communication network 82, shown in FIG. 7. The communication network 82 includes hardware, such as a communication bus, for facilitating communication among assembly 20 and vehicle 22 components, e.g., the sensor 26, the motors 64, 68, the computer 66, etc. The communication network 82 may facilitate wired or wireless communication among the vehicle 22 and assembly 20 components in accordance with a number of communication protocols such as controller area network (CAN), Ethernet, WiFi, Local Interconnect Network (LIN), and/or other wired or wireless mechanisms.

The computer 66, shown in FIG. 7, may be a microprocessor-based computer 66 implemented via circuits, chips, or other electronic components. For example, the computer 66 may include a processor, a memory, etc. The memory of the computer 66 may include memory for storing programming instructions executable by the processor as well as for electronically storing data and/or databases. The computer 66 is generally configured for communications with the assembly 20 and vehicle 22 components, on a controller area network (CAN) bus, e.g., the communication network 82, and for using other wired or wireless protocols to communicate with devices outside the vehicle 22, e.g., Bluetooth®, IEEE 802.11 (colloquially referred to as WiFi), satellite telecommunication protocols, and cellular protocols such as 3G, LTE, etc. Via the communication network 82 the computer 66 may transmit messages, information, data, etc., to various devices and/or receive messages, information, data, etc., from the various devices. Although the computer 66 is shown as a component of the vehicle 22, it is to be understood that the computer 66 could be a component of the assembly 20, e.g., in communication with the sensor 26, the motors 64, 68, etc., and supported by the first housing 24 or the second housing 28. Although one computer 66 is shown in FIG. 7 for ease of illustration, it is to be understood that the computer 66 could include, and various operations described herein could be carried out by, one or more computing devices.

The computer 66 may be programmed to actuate the first motor 64 and/or the second motor 68 to rotate the first spool 30 and the second spool 32 to move the transparent film 34 relative to the first housing 24. For example, the computer 66 may transmit an instruction to the first motor 64 and/or the second motor 68 via the communication network 82.

The computer 66 may actuate the first motor 64 and/or the second motor 68 upon a determination that the transparent film 34 is contaminated. The computer 66 may determine the transparent film 34 is contaminated based on information received from the sensor 26, e.g., via the communication network 82, e.g., using image recognition processes and methods.

For example, the computer 66 may compare images, received from the sensor 26 with each other and identify an artifact that is consistent among the images, e.g., dirt on the transparent film 34 will appear in a consistent location on the images while a remainder of the images will change. Upon identification of a threshold amount, e.g., a number, a total area, etc., of artifacts the computer 66 may determine the transparent film 34 is contaminated. For example, the area of the artifacts may be compared to a threshold area, e.g., 5 percent of the field of view. The number of artifacts may be compared to a threshold amount, e.g., 10 artifacts. When the area and/or number of artifacts is greater than the threshold area and/or threshold amount, the computer 66 may determine the transparent film 34 is contaminated.

For example, the computer 66 may identify data from the sensor 26 as being of low quality, e.g., a low resolution resulting from the contamination on the transparent shield interfering with focusing light on the sensor 26, inconsistent data from a LIDAR sensor indicating the light is not being transmitted and/or received in certain areas of the field of view of the sensor 26. Other techniques and processes, e.g., image recognition techniques and processes, may be used to determine that the transparent film 34 is contaminated.

The computer 66 may actuate the first motor 64 and/or the second motor 68 at time intervals. For example, the computer 66 may transmit an instruction to the first motor 64 and/or the second motor 68 to move the transparent film 34 a certain amount, wait a determined amount of time, e.g. 10 minutes, then transmit an instruction to the first motor 64 and/or the second motor 68 to again move the transparent film 34, and so on.

The computer 66 may be programmed to actuate the nozzle 76 to provide fluid. For example, the computer 66 may transmit an instruction to the washer fluid system 78, e.g., via the communication network 82. The instruction to the washer fluid system 78 may instruct the washer system to provide fluid to the nozzle 76. For example, the instruction may instruct the pump to an "on" state, e.g., to move fluid.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
a first housing;
a sensor in the first housing;
a second housing;
a first spool and a second spool rotatably supported in the second housing and spaced from each other; and
a transparent film extending from the first spool around the first housing and received by the second spool.

2. The assembly of claim 1, wherein the first spool is adjacent the second spool.

3. The assembly of claim 1, wherein the transparent film abuts the first housing.

4. The assembly of claim 1, wherein the first housing includes a lens defining a circumference, the transparent film extending around the circumference.

5. The assembly of claim 4, wherein the first housing includes a base, and the lens rotates relative the base.

6. The assembly of claim 1, wherein the first spool defines a first axis, and the second spool defines a second axis, the second axis parallel to and spaced from the first axis.

7. The assembly of claim 1, wherein the transparent film extends from the first spool between the first spool and the first housing, and wherein the transparent film is received by the second spool between the second spool and the first housing.

8. The assembly of claim 1, wherein the sensor is a LIDAR sensor.

9. The assembly of claim 1, further comprising a nozzle supported by the second housing and designed to spray fluid on the transparent film.

10. The assembly of claim 9, wherein the second housing includes a drain.

11. An assembly, comprising:
a sensor;
a housing having a first slot and a second slot;
a first spool in the housing;
a second spool in the housing and adjacent the first spool in a radial direction; and
a transparent film extending from the first spool, through the first slot, around the sensor, through the second slot, and received by the second spool.

12. The assembly of claim 11, wherein the first spool and the second spool are between the sensor and the first slot and the second slot.

13. The assembly of claim 11, wherein the first slot and the second slot are between the sensor and the first spool and the second spool.

14. The assembly of claim 11, wherein the sensor is in the housing.

15. The assembly of claim 11, further comprising a wiper designed to wipe the transparent film.

16. The assembly of claim 15, wherein the wiper is supported by the housing at the second slot.

17. The assembly of claim 11, wherein the transparent film extends from the first spool and is received by the second spool between the first spool and the second spool.

18. The assembly of claim 11, wherein the housing includes a lens and the transparent film abuts the lens.

19. The assembly of claim 11, wherein the housing includes a base and a cap, the transparent film disposed between the base and the cap.

* * * * *